May 12, 1925. 1,537,169
H. O. HEM
CHECK LINK MECHANISM FOR WEIGHING SCALES
Filed Aug. 15, 1918 2 Sheets-Sheet 2
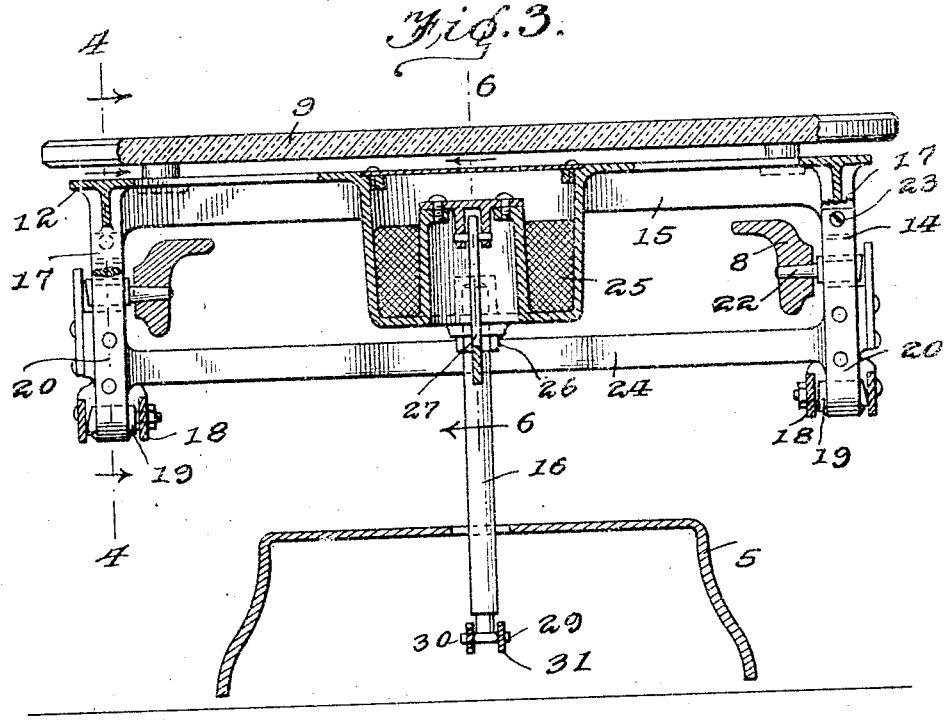
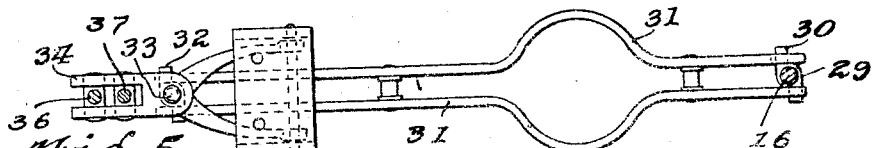
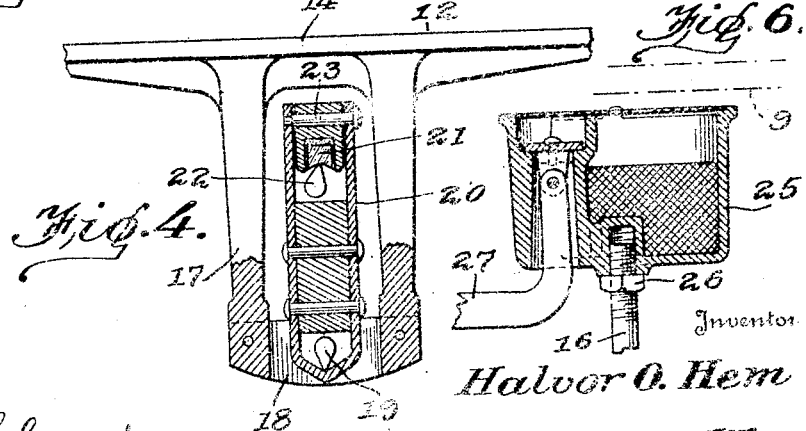
Inventor
Halvor O. Hem
By George R. Frye
Attorney
Witnesses Patented May 12, 1925.

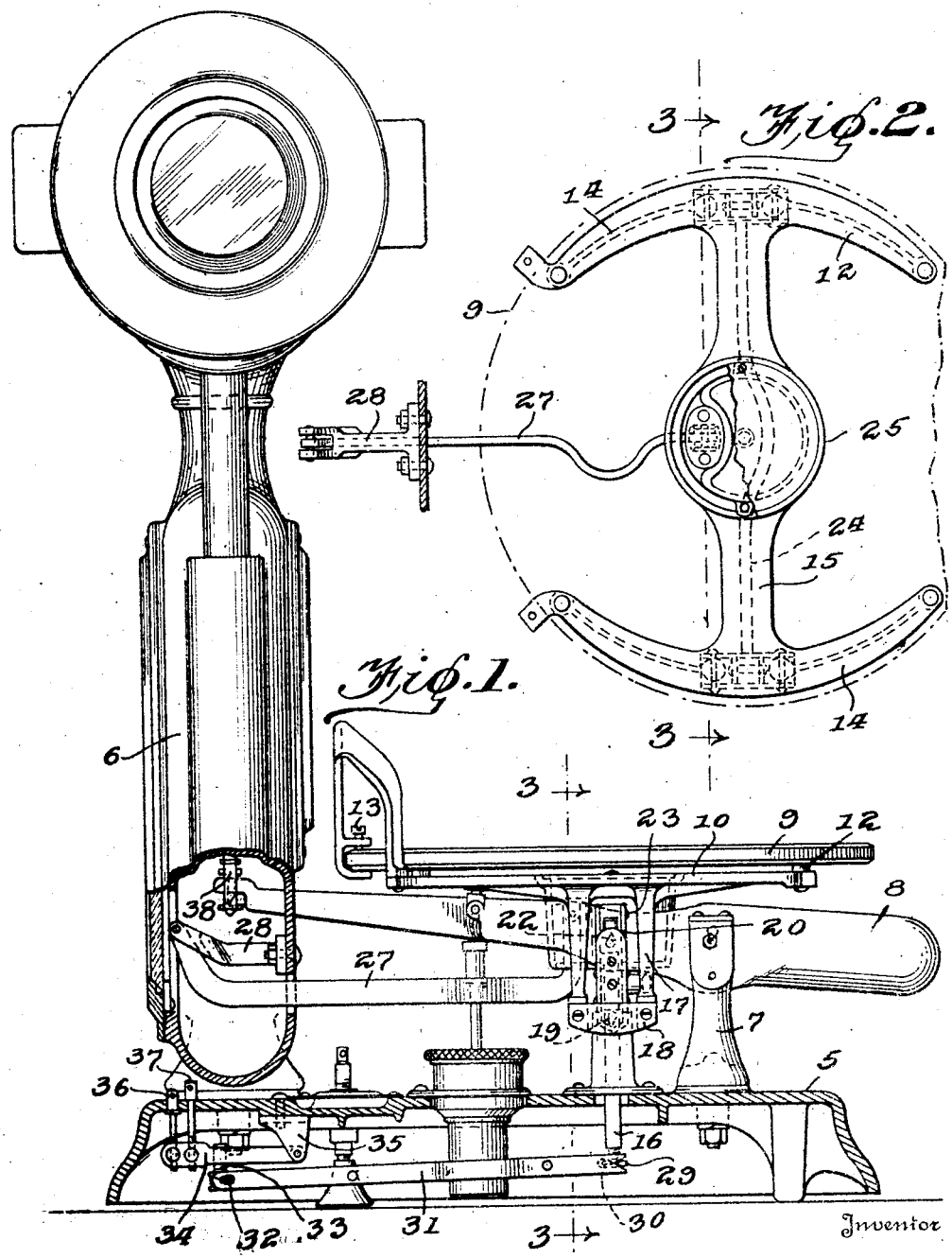

1,537,169

UNITED STATES PATENT OFFICE.

HALVOR C. HEM, OF TOLEDO, OHIO, ASSIGNOR TO TOLEDO SCALE COMPANY, OF TOLEDO, OHIO, A CORPORATION OF NEW JERSEY.

CHECK-LINK MECHANISM FOR WEIGHING SCALES.

Application filed August 15, 1918. Serial No. 249,871.

*To all whom it may concern:*

Be it known that I, HALVOR C. HEM, a citizen of the United States, residing at Toledo, in the county of Lucas and State of Ohio, have invented certain new and useful Improvements in Check-Link Mechanism for Weighing Scales, of which the following is a specification.

This invention relates to weighing scales, and more particularly to that type of weighing scales having a scale beam supporting a commodity-receiving platter upon two bearing pivots carried by the scale beam, such scales being familiarly known as counter scales and used upon the counters of stores, shops, factories and the like. In scales of this type having the platter supported on two-point bearings it is necessary to employ a check link mechanism to prevent the tipping of the platter when the load to be weighed is placed adjacent the edges thereof and to insure the proper distribution of weight upon the scale beam so that the commodity will weigh the same whether placed directly over the bearing pivots or at a distance therefrom. The check link mechanism heretofore employed has usually consisted of a check rod or link pivotally attached to a check post secured to the base or other stationary part of the scale and a post carried by the scale platter, this check link being of the same length as the distance between the fulcrum and platform-supporting pivots of the scale beam and arranged at such an angle as to always maintain a parallelogram.

In the present invention I have devised a construction working on a different theory and one wherein the distance between the fulcrum and load-supporting pivots bears no relation to the maintenance of the platform in horizontal position. In the present construction such changes as would render inaccurate the old form of check link, as the wearing of the pivots or bearings or warping of the beam, will have no effect on the check link mechanism herein disclosed.

My present invention includes the suspension of the commodity-receiving platter from the lever pivots by a wide frame having a post rigid therewith and two check links pivoted on the post and scale frame respectively in such relation as to maintain a parallelogram. This provides a parallelogram of much longer sides than in the old form of check link mechanism and wherein any sinking of the lever or the post due to the wear on the pivots, etc. will not affect the length of any side.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a side elevation of a weighing scale equipped with my improved check link mechanism, parts being broken away and shown in section;

Figure 2 is a detail plan view of the platter-supporting frame and upper check link connected therewith;

Figure 3 is a vertical sectional view taken substantially on the line 3—3 of Figs. 1 and 2;

Figure 4 is a detail section taken substantially on the line 4—4 of Fig. 3;

Figure 5 is a detail plan view of the lower check link member; and

Figure 6 is a detail section taken substantially on the line 6—6 of Fig. 3.

In the drawings, the numeral 5 designates the base of the scale and 6 the housing thereof. Formed on the base 5 are the usual base horns 7 supporting the scale beam 8. The commodity-receiving platter 9, preferably of glass, rests upon the supporting frame 10 which is provided with resilient lugs 12 for engagement with the platter. A suitable locking screw 13 may also be employed for holding the platter upon the frame. The frame preferably comprises spaced side members 14 connected by a central crossbar 15 (see Figs. 2 and 3) at the center of which is secured a depending post 16. The side portions 14 of the frame preferably carry spaced depending legs 17 supporting cross members 18 carrying pivots 19 for engagement in the lower extremity of links 20 (see Fig. 4), the upper portion of which carry bearings 21 resting upon the platform-supporting pivots 22 of the scale beam 8. The bearing 21 may be of agate, hardened steel, etc., and is preferably mounted upon a pin 23 arranged at right angles to the line of contact of the bearing with the platform-supporting pivot 22, thereby permitting movement of the link relatively to the pivot 22 in any direction. The construction of a platter-supporting frame of this type permits great width between the platform-supporting pivots of the scale beam, and to insure lateral stability at all times a crossbar 24 may be arranged to connect the links 20 on the opposite sides of the frame (see Fig. 3).

As herein shown, the post 16 is formed with an enlarged upper portion 25 hollowed to receive lead, etc. to properly balance the lever 8 and the parts carried thereby relatively to the load-offsetting element of the scale, and the lower portion of the post is threaded into the enlarged upper portion for vertical adjustment, substantially as shown in Fig. 6. A locking nut 26 may be provided to maintain any desired adjustment. The enlarged portion of the post 16 is pivotally connected, as shown in Fig. 6, with one end of the upper check link member 27, the other extremity of which extends within the housing 6 and is pivoted to the bracket 28 carried by such housing (see Figs. 1 and 2). The lower end of the post 16, as shown, is provided with a knife edge pivot 29 mounted for vertical adjustment in such post and having its knives 30 facing in opposite directions on opposite sides of the post (see Fig. 5). Spaced check members 31 forming the lower check link connect the knives 30 with similar knife edges in a pivot 32 mounted for vertical adjustment on a bolt 33 carried by the pivoted arm 34 (see Fig. 1). The arm 34 is preferably pivoted in a bracket 35 depending from the scale base and its free end is raised or lowered by rotating adjusting bolts 36 or 37 threaded into trunnions rotatably mounted in the arm 34. The distance between the knife edges of the pivot 29 and the pivot 32 of the lower check link is equal to the distance between the pivotal connections of the upper check link 27 with the post 16 and bracket 28 respectively, and the vertical adjustments are so made that a parallelogram is secured with the upper and lower check links and the post 16 forming three sides thereof. This parallelogram will be preserved despite wearing of the fulcrum or platform-supporting pivots of the scale beam, warping of the scale beam, etc., and owing to the great length of its horizontal sides will give marked stability to the platter.

In operation, the inner end of the scale beam 8 within the housing 6 is connected with a steelyard rod 38, etc. through which engagement is made with the pendulum or other load-offsetting mechanism of the scale. The placing of the commodity to be weighed upon the platter 9 will cause the inner end of the scale beam to swing downwardly exerting a pull upon the steelyard rod to operate the pendulum or other load-offsetting mechanism to counterbalance the weight of such commodity, and through suitable indicating means the weight of the commodity is shown. The lowering movement of the platter 9 carries with it the post 16 and rocks the upper and lower check links 27 and 31 on the bracket 28 and anchor pivot 32 respectively, these check links rocking through the same arc and thus maintaining the parallelogram at all points during the travel of the platter. It will be noted that the check links 27 and 31 swing through an arc extended in the opposite direction to the arc traversed by the scale beam 8.

While it will be apparent that the illustrated embodiment of my invention herein disclosed is well calculated to adequately fulfill the objects primarily stated, it is to be understood that the invention is susceptible to variation, modification and change without departing from the spirit and scope of the invention as set forth in the subjoined claims.

Having described my invention, I claim:

1. A check link mechanism for scales, comprising a scale frame, a lever fulcrumed thereon, a platform supported by the lever at a point located at a distance from the lever fulcrum, a pair of spaced check links of equal length extending from the platform in the direction opposite that of the lever fulcrum and connected with the platform and scale frame, and pivoted link connecting means between said check links and said lever permitting free eccentric movement of said check links and said lever.

2. A check link mechanism for scales comprising a scale frame, a lever fulcrumed thereon, a platform supported by the lever at a distance from the fulcrum, a pair of spaced check links of equal length connected with the platform and scale frame, and means for adjusting said check links vertically and laterally.

3. A check link mechanism for scales comprising a scale frame, a lever fulcrumed thereon, a platform supported by the lever at a distance from the fulcrum, a pair of spaced check links of equal length connected with the platform and scale frame, and means carried by the scale frame for adjusting one of said check links vertically and laterally.

4. A check link mechanism for scales comprising, in combination, a scale frame, a lever fulcrumed thereon, a platform, connecting means for supporting the platform by said lever at a distance from the fulcrum, and a pair of spaced check links of equal length connected with the platform and scale frame, the arrangements being such that the check links swing through arcs curved reversely to that traversed by the lever, said connecting means permitting eccentric movement of said platform and said lever.

5. In a scale, a supporting frame, a lever pivoted thereon, a platform, a check link mechanism co-operating with said lever and platform, comprising a frame suspended from the lever and supporting the platform, a post rigid with the platform, and a pair of check links connected with the supporting frame and with said post at different heights.

6. In a scale, a supporting frame, a lever pivoted thereon, a platform, a check link mechanism co-operating with said lever and platform, comprising a wide frame supporting the platform, means for suspending said frame from the lever, a depending member rigid with the platform, and a pair of check links connected with the supporting frame and with said post at different heights.

7. In a scale, a supporting frame, a lever pivoted thereon, a platform, a check link mechanism co-operating with said lever and platform, comprising a wide frame supporting the platform, a pair of links for suspending said frame from the lever, a post rigid with the platform, and a pair of check links connected with the supporting frame and with said post at different heights.

8. In a scale, in combination, a supporting frame, a lever fulcrumed thereon, pivots rigidly secured to said lever, links suspended from said pivots, means rigidly connecting said links, and a platform supported by said links.

9. In a scale, a supporting frame, a lever fulcrumed thereon, a platform supported by the lever, check links placed one above the other for stabilizing the platform, and adjustable connections for the check links to the platform and frame whereby the check link mechanism will form a parallelogram.

10. In a scale, in combination, a supporting frame, a lever fulcrumed thereon, a load pivot on said lever at a distance from the fulcrum thereof, a platform supported by said load pivot, pivoted link mechanism for holding said platform against tilting, said pivoted mechanism swinging through an arc the radius of which is greater than the distance from the lever fulcrum to the load pivot, and link connecting means permitting free eccentric movement of said pivoted link mechanism and said lever.

11. In a scale, in combination, a supporting frame, a lever fulcrumed thereon, a load pivot on said lever, a platform supported on said load pivot, link mechanism for holding said platform against tilting, said mechanism swinging through an arc of opposite curvature to that traversed by the load pivot and connecting means permitting free eccentric movement of said link mechanism and said lever.

12. In a scale, in combination, a frame, a lever fulcrumed thereon, a load pivot on said lever, a platform, means connecting said platform and said load pivot, means for causing said platform to swing about an arc different from the arc traversed by said load pivot, said means maintaining said platform in horizontal position the parts being so constructed and arranged as to permit free eccentric movement of said platform and said lever.

13. In a weighing scale, in combination, a supporting frame, a system of links connected thereto, said system including a pair of substantially horizontally extending links of equal length pivoted to said supporting frame, a commodity-receiver connected to said system of links and held in horizontal position thereby, a lever pivotally mounted on said frame to swing eccentrically to said links, and supporting connections between said system of links and said lever.

14. In a weighing scale, in combination, a rigid supporting frame, a deformable frame connected thereto, said deformable frame including a pair of substantially horizontally extending links of equal length pivoted to said rigid supporting frame, a commodity-receiver supported by said deformable frame, a lever pivoted upon said rigid frame to swing eccentrically to said deformable frame, and supporting connections between said lever and said deformable frame.

HALVOR HEM.

Witnesses:
GEORGE R. FRYE,
FRANCES C. DOYLE.